US 8,301,463 B2

(12) United States Patent
Lui et al.

(10) Patent No.: US 8,301,463 B2
(45) Date of Patent: Oct. 30, 2012

(54) EMERGENCY ALERT FEATURE ON A MOBILE COMMUNICATION DEVICE

(75) Inventors: Lam Lam Wong Lui, Pasig (PH); Helen Tandiono, Singapore (SG); Toh Beng Wooi, Selangor (MY)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 12/272,319

(22) Filed: Nov. 17, 2008

(65) Prior Publication Data

US 2010/0124900 A1    May 20, 2010

(51) Int. Cl.
*G06Q 40/00* (2006.01)
(52) U.S. Cl. ................................ 705/2; 705/3
(58) Field of Classification Search .................... 705/2–4
See application file for complete search history.

(56) References Cited

U.S. PATENT DOCUMENTS

| | | | |
|---|---|---|---|
| 5,515,419 A | 5/1996 | Sheffer | |
| 7,181,192 B2 | 2/2007 | Panasik et al. | |
| 7,574,237 B2 * | 8/2009 | Rolnik et al. | 455/564 |
| 2002/0196934 A1 * | 12/2002 | Kunimune | 379/433.06 |
| 2003/0137422 A1 * | 7/2003 | Nishibori | 340/573.1 |
| 2003/0207701 A1 * | 11/2003 | Rolnik et al. | 455/564 |
| 2005/0226154 A1 * | 10/2005 | Julka et al. | 370/235 |
| 2005/0243973 A1 * | 11/2005 | Laliberte | 379/37 |
| 2007/0042763 A1 * | 2/2007 | Yeh | 455/418 |

FOREIGN PATENT DOCUMENTS

| | | |
|---|---|---|
| CN | 1414768 | 4/2003 |
| GB | 2409128 A | 6/2005 |
| WO | 2006066629 | 6/2006 |

OTHER PUBLICATIONS

Wei et al., "MediaAlert—A Broadcast Video Monitoring and Alerting System for Mobile Users", Proceedings of the 3rd International Conference on Mobile System, Applications, & Services, Jun. 6-8, 2005, Seattle, WA, pp. 25-38.
Taylor et al., "A Disaster-Recovery Plan for Local Municipalities Using Currently Available Communication Satellite Facilities and Services", Skjei Telecom, May 2002, pp. 1-11.
Cheng et al., "SmartSiren: Virus Detection and Alert for Smartphones", International Conference on Mobile Systems, Applications and Services, Proceedings of the 5th International Conference on Mobile Systems, Applications and Services, ACM, 2007, pp. 258-271.

* cited by examiner

*Primary Examiner* — Luke Gilligan
*Assistant Examiner* — Reginald R Reyes
(74) *Attorney, Agent, or Firm* — Yee & Associates, P.C.; Steven L. Bennett

(57) ABSTRACT

Automatically establishing a connection with an emergency services server is provided. In response to receiving an emergency signal from a mobile communication device, a connection with the mobile communication device is established by a communications server. Location data, audio input data, and visual input data from the mobile communication device is received by the communications server. Personal data for an owner of the mobile communication device is retrieved by the communications server from a storage device connected to a network. A connection with an emergency services server for a current locale of the mobile communication device is automatically established by the communications server. Then, the emergency signal, location data, audio input data, and visual input data received from the mobile communication device, along with the retrieved personal data, is transmitted by the communications server to the emergency services server for use by emergency service personnel.

12 Claims, 4 Drawing Sheets

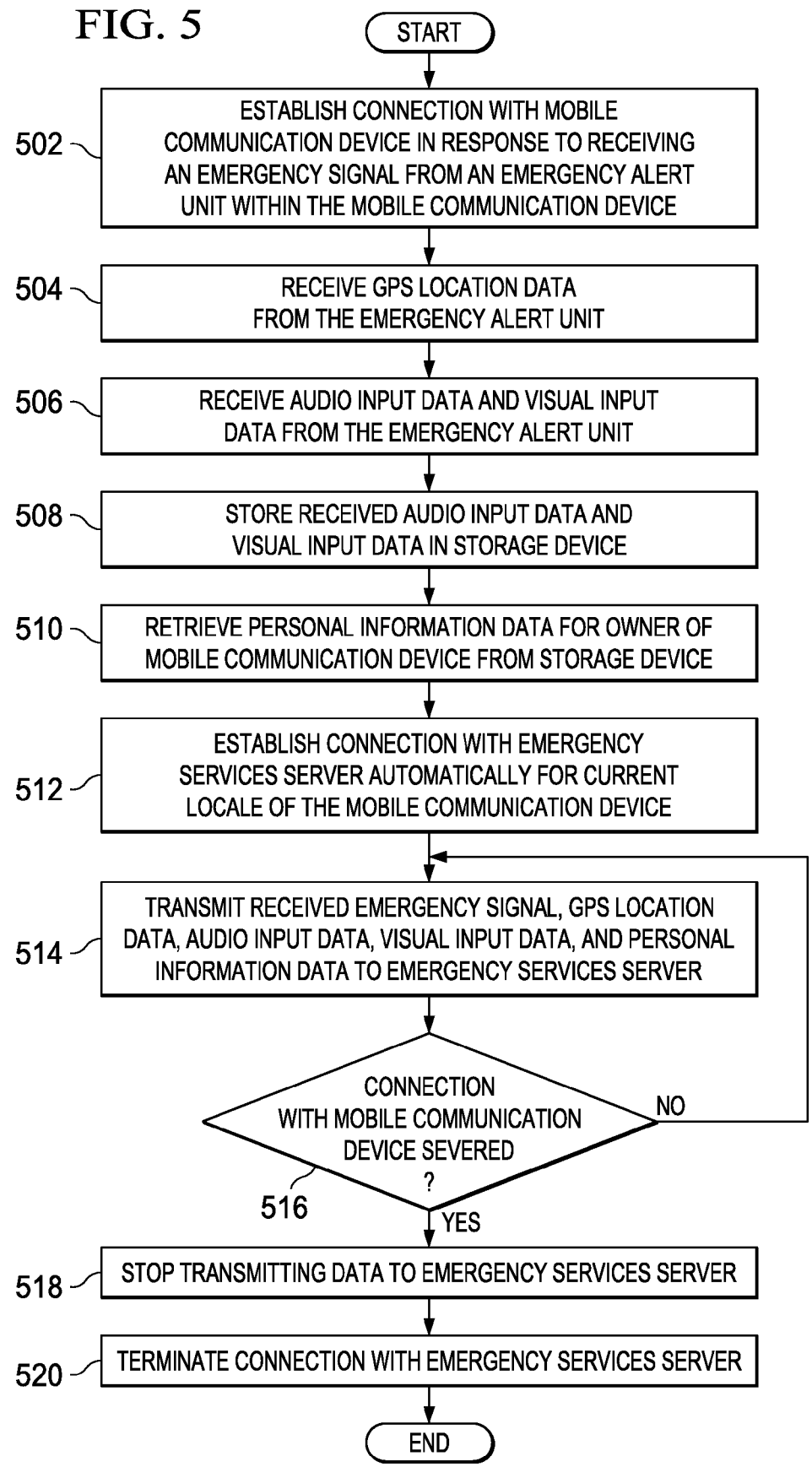

EMERGENCY ALERT FEATURE ON A MOBILE COMMUNICATION DEVICE

BACKGROUND OF THE INVENTION

1. Field of the Invention

The present invention relates generally to an improved data processing system and more specifically to a computer implemented method, system, and computer usable program code for automatically establishing a connection with an emergency services server on demand on an ad hoc basis in response to activation of an emergency alert feature on a mobile communication device.

2. Description of the Related Art

Today, for a user to call for emergency assistance via a mobile communication device, the user needs to remember the network or country specific emergency number, such as 000, 911, 999, or 112. For example, 000 is Australia's primary emergency service number; 911 is the United States' primary emergency service number, 999 is the primary emergency service number of many other countries; and 112 is the global system for mobile communications (GSM) standard emergency service number.

In addition, the user needs to know the user's current location to relay that information to emergency service personnel. However, according to a recent study more than fifty percent of the people who make a call to emergency services cannot tell emergency service personnel where they are specifically located, especially when in remote areas on highways or in jungle, forest, or mountain areas. Further, the mobile communication device user may not be able to dial the emergency service number to call for help, especially when calling for help actually increases the danger to the user. For example, during a robbery, rape, attempted murder, kidnapping, mad gun-man situation, or hostage situation the user is not able to take out a mobile communication device and safely call authorities. In these types of emergency situations, the user needs to alert emergency service personnel quickly and discretely.

BRIEF SUMMARY OF THE INVENTION

According to one embodiment of the present invention, a connection with an emergency services server is automatically established. In response to receiving an emergency signal from a mobile communication device, a connection with the mobile communication device is established by a communications server. Location data, audio input data, and visual input data from the mobile communication device is received by the communications server. Personal data for an owner of the mobile communication device is retrieved by the communications server from a storage device connected to a network. A connection with an emergency services server for a current locale of the mobile communication device is automatically established by the communications server. Then, the emergency signal, location data, audio input data, and visual input data received from the mobile communication device, along with the retrieved personal data for the owner of the mobile communication device, is transmitted by the communications server to the emergency services server for use by emergency service personnel.

BRIEF DESCRIPTION OF THE SEVERAL VIEWS OF THE DRAWINGS

FIG. 5 is a flowchart illustrating an exemplary process for automatically establishing a connection with an emergency services server in accordance with an illustrative embodiment.

DETAILED DESCRIPTION OF THE INVENTION

Figure 1:
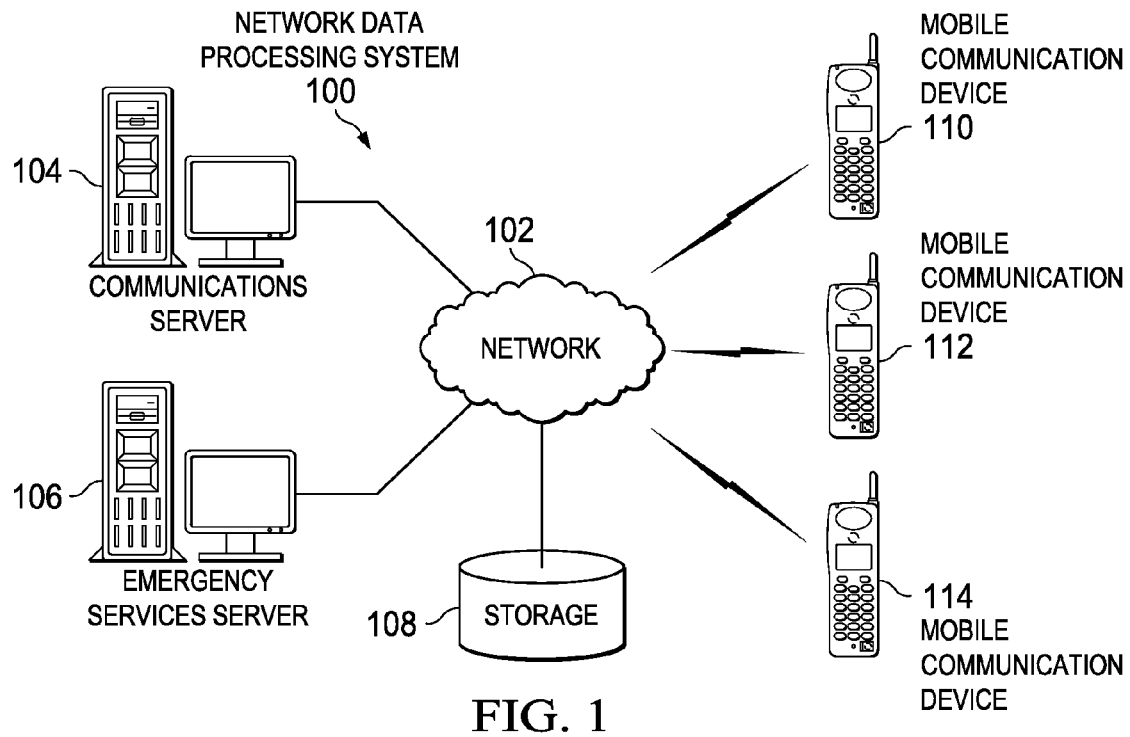
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowcharts and/or block diagram block or blocks.

Figure 3:
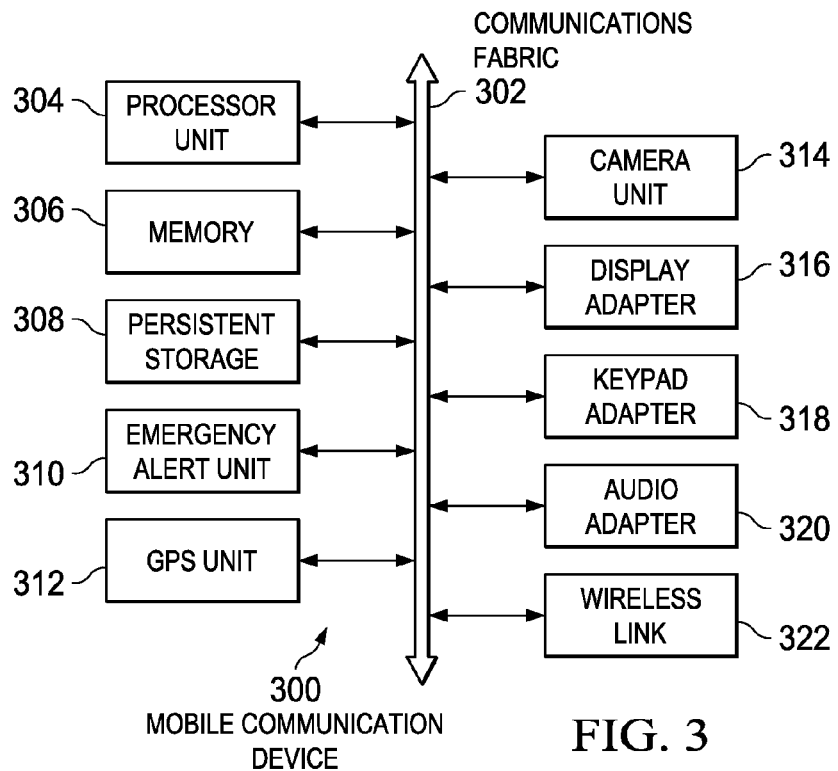
FIG. 3 is a block diagram of components in a mobile communication device in accordance with an illustrative embodiment.
Figure 2:
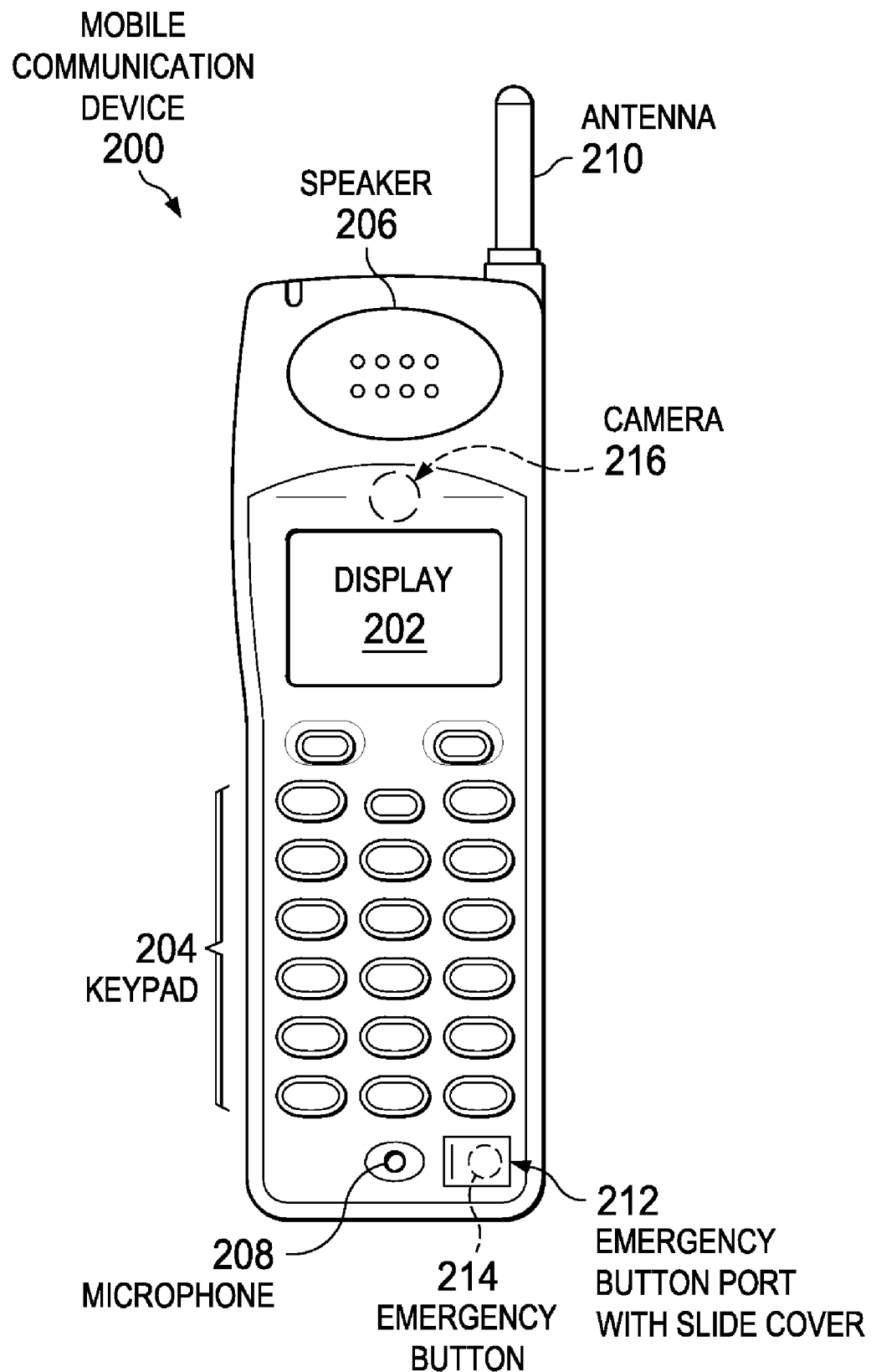
FIG. 2 is a pictorial representation of a mobile communication device in which illustrative embodiments may be implemented.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to data processing environments in which different illustrative embodiments may be implemented. Many modifications to the depicted environments may be made.

FIG. 1 depicts a pictorial representation of a network of data processing systems in which illustrative embodiments may be implemented. Network data processing system 100 is a network of data processing systems, such as, for example, computers, mobile communication devices, and other devices, in which the illustrative embodiments may be implemented. Network data processing system 100 contains network 102. Network 102 is the medium used to provide communications links between the various computers and other devices connected together within network data processing system 100. Network 102 may include connections, such as wire, wireless communication links, or fiber optic cables.

In the depicted example, server 104 and server 106 connect to network 102, along with storage unit 108. Server 104 is a communications server with high speed connections to network 102. Also, communications server 104 may represent a plurality of communications servers. Further, communications server 104 may reside within a cellular telephone service provider (SP) network. Alternatively, communications server 104 may independently provide communications services for a plurality of cellular telephone SP networks. Communications server 104 is a server that monitors and controls incoming and outgoing communications for mobile communication SPs within a defined service area.

Server 106 is an emergency services server with high speed connections to network 102. In addition, emergency services server 106 may represent a plurality of emergency services servers. Emergency services server 106 is a server that monitors and controls incoming and outgoing communications for emergency service providers within a defined area.

Storage 108 represents any type of storage device that is capable of storing data in a structured or unstructured format. Also, storage 108 may represent a plurality of storage units coupled to network 102. Storage 108 may, for example, be a database for a mobile communication SP that stores customer information, such as name(s) of account holders, telephone number(s) of the account holders, personal identification number(s) for the account holders, personal profile information for the account holders, and emergency contact information for the account holders. However, it should be noted that storage 108 may contain any necessary data, such as, for example, location information for mobile communication devices and audio/visual recordings, for processes of illustrative embodiments to automatically provide emergency service providers with the appropriate information when needed.

Mobile communication devices 110, 112, and 114 also connect to network 102 via wireless means. In this exemplary illustration, mobile communication devices 110, 112, and 114 are cellular telephones relying on wireless communication links. However, it should be noted that in addition to being cellular telephones, mobile communication devices 110, 112, and 114 may, for example, be personal digital assistants (PDAs), smart cellular telephones, handheld computers, or any other mobile device, such as pagers, handheld gaming devices, or wristwatches, capable of accomplishing processes of illustrative embodiments. Mobile communication devices 110, 112, and 114 are clients to communications server 104.

Communications server 104 provides communications services to mobile communication devices 110, 112, and 114. Further, communications server 104 may also provide data, such as boot files, operating system images, and applications to mobile communication devices 110, 112, and 114. Moreover, network data processing system 100 may include additional servers, clients, and other devices not shown to implement processes of illustrative embodiments.

Of course, network data processing system 100 may be implemented as a number of different types of networks, such as, for example, an intranet, a local area network (LAN), a wide area network (WAN), or the Internet. Also, it should be noted that FIG. 1 is only intended as an example and not as an architectural limitation for the different illustrative embodiments. Furthermore, it should be appreciated by those of ordinary skill in the art that even though FIG. 1 depicts a cellular telephone network, illustrative embodiments may be implemented in any type of wireless/mobile system.

Illustrative embodiments provide a computer implemented method, system, and computer usable program code for automatically establishing a connection with an emergency services server on demand on an ad hoc basis in response to activation of an emergency alert feature on a mobile communication device during an emergency situation. Illustrative embodiments allow a user of a mobile communication device, such as a cellular telephone, to automatically alert emergency service personnel when the mobile communication device is located within the user's pocket or purse, without removing the mobile communication device from its current location. As a result, the user may discretely alert emergency service personnel, such as the police, without posing any additional danger to the user during the emergency situation. Also, illustrative embodiments allow technology challenged users, such as, for example, elderly users, disabled users, or illiterate users, to trigger an emergency alert by using only 1 finger if necessary. Consequently, users of mobile communication devices utilizing illustrative embodiments are not required to know, remember, or dial different emergency numbers for different locales, even more so during times of emergency and increased stress. Further, illustrative embodiments do not require the user to speak when sending an emergency alert, although the user may choose to if desired.

Moreover, illustrative embodiments may automatically activate one or more functions on the mobile communication device when the user presses the alert button. For example, illustrative embodiments may automatically activate a microphone to continuously record and store any sounds or voices picked up by the microphone. In addition, illustrative embodiments may automatically activate a GPS function to send GPS location data to a communications server. Illustrative embodiments may send the GPS location data via small message service (SMS) or other method, for example. Further, illustrative embodiments may automatically activate a camera function to intermittently take photographs every 10 seconds or take continuous video. All this captured data (i.e., sound, picture, video, and location) is critical for any rescue operation. Furthermore, this captured data may also be critical as evidence in court.

When the user of the mobile communication device is in danger, the user simply presses an emergency button, which is located under a slide cover, to quickly and discretely alert emergency service personnel without having to know or dial the emergency number for the user's current location. The emergency button may include touch-friendly Braille-like dots or symbols in order for the user to find, press, and activate the emergency button just by sense of touch alone. Thus, these Braille-like dots or symbols enable activation of the emergency button even when the user is not looking at the mobile communication device.

After activation of the emergency button, the mobile communication device then automatically connects to the communications server for the service area that the mobile communication device is currently located, such as in a foreign country. A foreign country is a country other than the primary residence of the owner of the mobile communication device. In addition, the foreign country may have a different emergency service number than the primary residence country of the mobile communication device owner.

It should be noted that illustrative embodiments do not store the worldwide emergency numbers in the mobile communication device or the GSM subscriber identity module (SIM). The emergency service numbers for all the different countries are not stored in the mobile communication device or the GSM SIM because if any country were to change its emergency service number, then the emergency number data in the mobile communication device or SIM would be outdated. Instead, after activation of the emergency button, the mobile communication device automatically connects to the local communications server and then the local communication server automatically connects to the emergency services server for the current location of the mobile communication device. The communications server also sends the emergency services server all audio and visual data recordings, along with GPS location data, sent from the mobile communication device. In an alternative illustrative embodiment, the mobile communication device may retrieve the local emergency service number on demand on an ad hoc basis from the local mobile network SP's database in real time when the emergency button is activated and then automatically dial the local emergency service number, itself.

With reference now to FIG. 2, a pictorial representation of a mobile communication device is shown in which illustrative embodiments may be implemented. In this exemplary illustration, mobile communication device 200 is a cellular telephone. However, it should be noted that illustrative embodiments may utilize any type of mobile communication device capable of accomplishing processes of illustrative embodiments. Mobile communication device 200 may, for example, be mobile communication device 110 in FIG. 1.

Mobile communication device 200 includes display 202 to present textual and graphical information to a user. Display 202 may be a display device, such as, for example, a liquid crystal display (LCD) or an organic light-emitting diode (OLED) display. Mobile communication device 200 also includes keypad 204, speaker 206, and microphone 208. A user may utilize keypad 204 to enter telephone numbers, user identification information, and commands for interacting with the interface. Mobile communication device 200 may present audio output via speaker 206.

A user may utilize microphone 208 not only for voice communication, but also for entering specific voice commands for voice actuated functions. In addition, mobile communication device 200 may automatically activate microphone 208 to record audio input data during emergency situations after activation of an emergency signal in mobile communication device 200. Further, mobile communication device 200 uses antenna 210 to establish wireless communication links with a network, such as, for example, network 102 in FIG. 1. It should be noted that even though antenna 210 is shown as an external antenna in this exemplary illustration, antenna 210 may represent an internal antenna as well.

Mobile communication device 200 further includes emergency button port with slide cover 212. Emergency button port with slide cover 212 is a port, which houses emergency button 214, that includes a sliding top cover. A user may utilize emergency button 214 to activate an emergency signal, which mobile communication device 200 uses to initiate processes of illustrative embodiments. Emergency button 214 may, for example, include Braille-like raised dots or symbols for easy identification. The sliding top cover on emergency button port with slide cover 212 protects emergency button 214 from accidental activation.

In an alternative illustrative embodiment, emergency button 214 may, for example, be two adjacent buttons located on one side of mobile communication device 200. In yet another alternative embodiment, the two emergency buttons may be located on opposite sides of mobile communication device 200. In either alternative embodiment, the two buttons must be simultaneously depressed for a predetermined period of time, such as, for example, three seconds, prior to activation of the emergency signal. Simultaneously depressing the two emergency buttons for a predetermined period of time prevents accidental activation of the emergency signal. In addition, the two emergency buttons may use a bright color, such as red, for easy identification.

Mobile communication device 200 also includes camera 216. A user may utilize camera 216 to take still photographs and video clips. In addition, mobile communication device 200 may automatically activate camera 216 to take photographs and/or video in order to record events during an emergency situation after activation of emergency button 214.

With reference now to FIG. 3, a block diagram of components in a mobile communication device is depicted in accordance with an illustrative embodiment. Mobile communication device 300 may, for example, be implemented in mobile communication device 200 in FIG. 2. Mobile communication device 300 is an example of a data processing system in which computer-usable program code or instructions implementing processes of illustrative embodiments may be located.

In this exemplary illustration, mobile communication device 300 includes communications fabric 302, which provides communications between processor unit 304, memory 306, persistent storage 308, emergency alert unit 310, global positioning system (GPS) unit 312, camera unit 314, display adapter 316, keypad adapter 318, audio adapter 320, and wireless link 322. However, it should be noted that this illustration of mobile communication device 300 is only shown for exemplary purposes and is not meant as an architectural limitation to illustrative embodiments. In other words, mobile communication device 300 may include more or fewer components as necessary to perform processes of illustrative embodiments.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306, in these examples, may be, for example, a random access memory (RAM) or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, or some combination thereof. The media used by persistent storage 308 also may be removable. For example, a removable hard drive may be used for persistent storage 308. In addition, persistent storage 308 may represent a plurality of persistent storage units. It should be noted that mobile communication device 300 may store data in a remote storage device, such as storage 108 in FIG. 1, in addition to, or instead of persistent storage 308.

Instructions for an operating system and applications or programs are located on persistent storage 308. The instructions for the operating system and applications or programs may be loaded into memory 306 for execution by processor unit 304. The processes of the different embodiments may be performed by processor unit 304 using computer implemented instructions, which may be located in a memory, such as memory 306. These instructions are referred to as program code, computer-usable program code, or computer-readable program code that may be read and executed by a processor in processor unit 304. The program code in the different illustrative embodiments may be embodied on different physical or tangible computer-readable media, such as memory 306 or persistent storage 308.

Emergency alert unit 310 monitors and controls processes of illustrative embodiments within mobile communication device 300 during an emergency situation after a user activates an emergency button, such as emergency button 214 in FIG. 2, to produce an emergency signal. The emergency signal signals emergency alert unit 310 to automatically connect to an SP's communications server, such as communications server 104 in FIG. 1, and forward the emergency signal to the communications server. It should be noted that a user of mobile communication device 300 may enable and disable emergency alert unit 310 independently of other mobile communication device 300 functions and features. Furthermore, it should be noted that emergency alert unit 310 may be implemented entirely as software, hardware, or as a combination of software and hardware components. Moreover, emergency alert unit 310 may be located remotely within the SP's communications server in addition to, or instead of, within mobile communication device 300.

Emergency alert unit 310 uses GPS unit 312 to provide GPS coordinate data for identifying the exact location of mobile communication device 300 anywhere around the world at any time after activation of the emergency signal. Emergency alert unit 310 sends this location data provided by GPS unit 312 to the SP's communications server. In an alternative embodiment, GPS unit 312 is a GPS transceiver unit capable of transmitting and receiving GPS data. In this alternative embodiment, GPS unit 312 directly sends the location data to the SP's communications server. In another alternative embodiment, the SP's communications server may, for example, utilize cellular telephone tower triangulation to locate the position of mobile communication device 300.

Camera unit 314 provides mobile communication device 300 with the capability of taking still photographs and video clips. Emergency alert unit 310 may automatically activate camera unit 314 to take photographs and/or take video clips after activation of the emergency signal. After emergency alert unit 310 receives the emergency signal, emergency alert unit 310 may direct camera unit 314 to take still photographs at predetermined time intervals, such as every 5 seconds, 10 seconds, 30 seconds, or 60 seconds, as long as a connection to the communications server is maintained. In addition, emergency alert unit 310 may direct camera unit 314 to continuously video events during connection to the communications server after receiving the emergency signal. Alternatively, emergency alert unit 310 may direct camera unit 314 to take video clips of a predetermined length, such as 5 seconds, 10 seconds, 30 seconds, or 60 seconds, at predetermined time intervals. Emergency alert unit 310 records and stores this photographic and video data in persistent storage 308. In addition, emergency alert unit 310 sends this photographic and video data to the communications server.

Display adapter 316 controls functionality for a display device, such as display 202 in FIG. 2. Keypad adapter 318 controls functionality for a keypad, such as keypad 204 in FIG. 2. Audio adapter 320 controls functionality of a speaker and a microphone, such as speaker 206 and microphone 208 in FIG. 2. Emergency alert unit 310 may automatically activate the microphone to continuously or intermittently record audio inputs after activation of the emergency signal. Emergency alert unit 310 stores this recorded audio input data in persistent storage unit 308. In addition, emergency alert unit 310 also sends this audio data to the communications server.

Wireless link 322 may, for example, utilize shortwave, high frequency, ultra high frequency, microwave, wireless fidelity (Wi-Fi™), Bluetooth® technology, or any other wireless communication means to establish wireless communication links for mobile communication device 300. Mobile communication device 300 also may rely on wireless application protocol (WAP) for facilitating communications. WAP is a standard for providing wireless telephones, pagers, and other handheld devices with secure access to e-mail and text-based Web pages. WAP provides a complete environment for wireless applications that includes a wireless counterpart of TCP/IP and a framework for telephony integration, such as call control and phone book access.

WAP runs over all the major wireless networks now in place. Also, WAP is device independent, requiring only a minimum functionality in the unit so that WAP may be used with a myriad of cellular phones and other mobile communication devices. However, it should be pointed out that WAP has been described for illustration purposes, and other wireless protocols may be used to implement illustrative embodiments.

Those of ordinary skill in the art will appreciate that the components depicted in FIG. 3 may vary depending on implementation of illustrative embodiments. Other internal components or peripheral devices may be used in addition to, or in place of, the components shown in FIG. 3. For example, mobile communication device 300 also may include a voice recognition system in order to perform functions activated by user voice command. As a further example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system.

Figure 4:
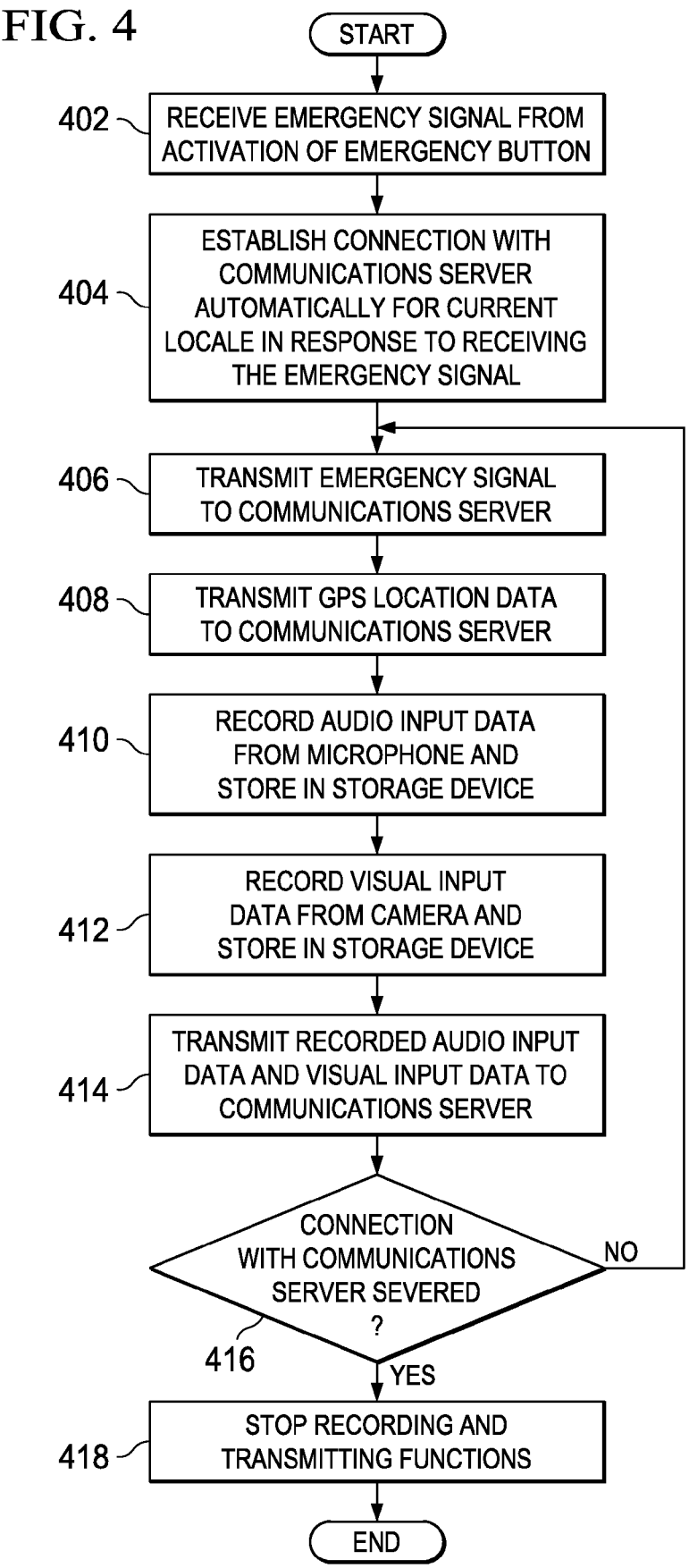
FIG. 4 is a flowchart illustrating an exemplary process for automatically establishing a connection with a communications server in accordance with an illustrative embodiment.

With reference now to FIG. 4, a flowchart illustrating an exemplary process for automatically establishing a connection with a communications server is shown in accordance with an illustrative embodiment. The process shown in FIG. 4 may be implemented in an emergency alert unit, such as emergency alert unit 310 in FIG. 3.

The process begins when the emergency alert unit receives an emergency signal from activation of an emergency button, such as emergency button 214 in FIG. 2, by a user of the mobile communication device (step 402). After receiving the emergency signal in step 402, the emergency alert unit automatically establishes a connection with a communications server, such as communications server 104 in FIG. 1, for a current locale for the mobile communication device (step 404). Then, the emergency alert unit transmits the emergency signal to the communications server (step 406).

In addition, the emergency alert unit transmits GPS location data for the mobile communications device to the communications server (step 408). Further, the emergency alert unit automatically records audio input data from a microphone, such as microphone 208 in FIG. 2, and stores these audio recordings in a storage device, such as persistent storage 308 in FIG. 3 (step 410). Furthermore, the emergency alert unit automatically records visual input data (i.e., photographs and/or video) from a camera, such as camera 216 in FIG. 2, and stores these visual recordings in the storage device, as well (step 412). Moreover, the emergency alert unit transmits the recorded audio input data and visual input data to the communications server (step 414).

Then, the emergency alert unit makes a determination as to whether the connection with the communications server has been severed (step 416). If the connection with the communications server has not been severed, no output of step 416, then the process returns to step 406 where the emergency alert unit continues recording and transmitting functions associated with the activation of the emergency signal. If the connection with the communications server has been severed, yes output of step 416, then the emergency alert unit stops the recording and transmitting functions associated with the activation of the emergency signal (step 418). Thereafter, the process terminates.

With reference now to FIG. 5, a flowchart illustrating an exemplary process for automatically establishing a connection with an emergency services server is shown in accordance with an illustrative embodiment. The process shown in FIG. 5 may be implemented in a communications server, such as communications server 104 in FIG. 1.

The process begins when the communications server establishes a connection with a mobile communication device, such as mobile communication device 112 in FIG. 1, in response to receiving an emergency signal from an emergency alert unit, such as emergency alert unit 310 in FIG. 3, within the mobile communication device (step 502). After establishing the connection with the mobile communication device in step 502, the communications server receives GPS location data from the emergency alert unit (step 504). In addition, the communications server receives audio input data and visual input data from the emergency alert unit (step 506).

Further, the communications server stores the received audio input data and visual input data in a storage device, such as storage 108 in FIG. 1 (step 508). Furthermore, the communications server retrieves personal information for an owner of the mobile communication device from the storage device (step 510). Moreover, the communications server automatically establishes a connection with an emergency services server, such as emergency services server 106 in FIG. 1, for the current locale of the mobile communication device (step 512). After establishing the connection with the emergency services server in step 512, the communications server transmits the received emergency signal, GPS location data, audio input data, visual input data, and personal information data to the emergency services server for forwarding to the appropriate emergency services providers (step 514).

Then, the communications server makes a determination as to whether the connection with the mobile communication device has been severed (step 516). If the connection with the mobile communication device has not been severed, no output of step 516, then the process returns to step 514 where the communications server continues to transmit received data associated with the activation of the emergency signal within the mobile communication device. If the connection with the mobile communication device has been severed, yes output of step 516, then the communications server stops transmitting data associated with the activation of the emergency signal within the mobile communication device to the emergency services server (step 518). Then, the communications server terminates the connection with the emergency services server (step 520). The process terminates thereafter.

Thus, illustrative embodiments of the present invention provide a computer implemented method, system, and computer program product for automatically establishing a connection with an emergency services server on demand on an ad hoc basis in response to activation of an emergency alert feature on a mobile communication device during an emergency situation. As a result, illustrative embodiments do not require the user of the mobile communication device to know, remember, or dial the emergency services number for the current location of the user, even if the user is in a foreign country that utilizes a different emergency service number. In addition, illustrative embodiments do not require that the different emergency services numbers for the different countries be stored in the mobile communication device or the GSM SIM for establishing connections with emergency services servers.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically establishing a connection with a communications server, the computer implemented method comprising the steps of:

receiving, by a mobile communication device, an emergency signal from activation of a single emergency button located in an emergency button port under a slide cover that only covers the emergency button port on the mobile communication device without user input of an emergency services number;

responsive to the mobile communication device receiving the emergency signal from the activation of the single emergency button without the user input of the emergency services number, establishing, by the mobile communication device, the connection with the communications server automatically for a current locale of the mobile communication device and automatically recording, by the mobile communication device, audio input data from a microphone and visual input data from a camera, wherein the visual input data is a video clip of a predetermined length automatically taken by the camera intermittently at predetermined time intervals after the activation of the single emergency button;

transmitting, by the mobile communications device, the emergency signal, the audio input data, and the visual input data associated with the activation of the single emergency button to the communications server;

determining, by the mobile communication device, that the connection with the communications server is severed; and responsive to the mobile communication device determining that the connection with the communications server is severed, stopping, by the mobile communication device, automatic recording and transmitting functions associated with the activation of the single emergency button.

2. The computer implemented method of claim 1, further comprising the step of:
responsive to the mobile communication device receiving the emergency signal from the activation of the single emergency button, transmitting, by the mobile communication device, location data for the mobile communication device to the communications server.

3. The computer implemented method of claim 1, further comprising the steps of:
storing, by the mobile communication device, the audio input data and the visual input data in a storage device within the mobile communication device.

4. The computer implemented method of claim 1, wherein the current locale of the mobile communication device is in a foreign country other than a primary residence of an owner of the mobile communication device that has a different emergency service number than the primary residence.

5. The computer implemented method of claim 1, wherein the single emergency button includes Braille-like dots.

6. The computer implemented method of claim 1, wherein the mobile communication device automatically activates the microphone and the camera in response to activation of the emergency signal by a user pressing the single emergency button.

7. A mobile communication device for automatically establishing a connection with a communications server, the mobile communication device comprising:
a bus system;
a storage device connected to the bus system, wherein the storage device stores a set of instructions; and
a processing unit connected to the bus system, wherein the processing unit executes the set of instructions to receive an emergency signal from activation of a single emergency button located in an emergency button port under a slide cover that only covers the emergency button port on the mobile communication device without user input of an emergency services number; establish the connection with the communications server automatically for a current locale of the mobile communication device and automatically record audio input data from a microphone and visual input data from a camera in response to receiving the emergency signal from the activation of the single emergency button without the user input of the emergency services number, wherein the visual input data is a video clip of a predetermined length automatically taken by the camera intermittently at predetermined time intervals after the activation of the single emergency button; transmit the emergency signal, the audio input data, and the visual input data associated with the activation of the single emergency button to the communications server; determine that the connection with the communications server is severed; and stop automatic recording and transmitting functions associated with the activation of the single emergency button in response to determining that the connection with the communications server is severed.

8. The mobile communication device of claim 7, wherein the processing unit executes a further set of instructions to transmit location data for the mobile communication device to the communications server in response to receiving the emergency signal from the activation of the single emergency button.

9. A computer program product stored in a computer readable storage device having computer usable program code embodied therein that is executable by a mobile communication device for automatically establishing a connection with a communications server, the computer program product comprising:
computer usable program code for receiving, by the mobile communication device, an emergency signal from activation of a single emergency button located in an emergency button port under a slide cover that only covers the emergency button port on the mobile communication device without user input of an emergency services number;
computer usable program code for establishing, by the mobile communication device, the connection with the communications server automatically for a current locale of the mobile communication device and automatically recording, by the mobile communication device, audio input data from a microphone and visual input data from a camera in response to the mobile communication device receiving the emergency signal from the activation of the single emergency button without the user input of the emergency services number, wherein the visual input data is a video clip of a predetermined length automatically taken by the camera intermittently at predetermined time intervals after the activation of the single emergency button;
computer usable program code for transmitting, by the mobile communication device, the emergency signal, the audio input data, and the visual input data associated with the activation of the single emergency button to the communications server;
computer usable program code for determining, by the mobile communication device, that the connection with the communications server is severed; and
computer usable program code for stopping, by the mobile communication device, automatic recording and transmitting functions associated with the activation of the single emergency button in responsive to the mobile communication device determining that the connection with the communications server is severed.

10. The computer program product of claim 9, further comprising:
computer usable program code for transmitting, by the mobile communication device, location data for the mobile communication device to the communications server in response to the mobile communication device receiving the emergency signal from the activation of the single emergency button.

11. The computer program product of claim 9, further comprising:
computer usable program code for storing, by the mobile communication device, the recorded audio input data and visual input data in a storage device within the mobile communication device.

12. The computer program product of claim 9, wherein the current locale of the mobile communication device is in a foreign country other than a primary residence of an owner of the mobile communication device that has a different emergency service number than the primary residence.

* * * * *